(12) United States Patent
Xu et al.

(10) Patent No.: US 12,256,408 B2
(45) Date of Patent: Mar. 18, 2025

(54) SIGNAL PROCESSING METHOD AND APPARATUS, STORAGE MEDIUM, PROCESSOR, AND ELECTRONIC DEVICE

(71) Applicant: GUANGDONG OPPO MOBILE TELECOMMUNICATIONS CORP., LTD., Guangdong (CN)

(72) Inventors: Weijie Xu, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 350 days.

(21) Appl. No.: 17/812,877

(22) Filed: Jul. 15, 2022

(65) Prior Publication Data

US 2022/0353895 A1 Nov. 3, 2022

Related U.S. Application Data (63) Continuation of application No. PCT/CN2020/072791, filed on Jan. 17, 2020.

(51) Int. Cl.
*H04W 72/23* (2023.01)

(52) U.S. Cl.
CPC .................. *H04W 72/23* (2023.01)

(58) Field of Classification Search
CPC ... H04W 72/23; H04W 72/044; H04W 80/02; H04W 16/14; H04L 5/0044; H04L 1/08; H04L 5/00; H04L 1/0003
See application file for complete search history.

(56) References Cited

U.S. PATENT DOCUMENTS

2019/0165894 A1* 5/2019 Choi ............... H04L 5/0044
2019/0363843 A1* 11/2019 Gordaychik ........ H04W 72/044
(Continued)

FOREIGN PATENT DOCUMENTS

CN 107889263 A * 4/2018 ........... H04L 1/0003
CN 108023722 A * 5/2018 ........... H04B 7/0417
(Continued)

OTHER PUBLICATIONS

Qualcomm Incorporated, "Cross-slot scheduling power saving techniques," 3GPP Tsg-Ran WG1 #98bis, R1-1911130, Oct. 2019. (Year: 2019).*
(Continued)

*Primary Examiner* — Ayaz R Sheikh
*Assistant Examiner* — Louis Samara
(74) *Attorney, Agent, or Firm* — Hodgson Russ LLP (57) ABSTRACT

Disclosed are a signal processing method and apparatus, a storage medium, a processor, and an electronic device. The method comprises: receiving dynamic control signaling from a network-side device in a preset period with a first duration unit, wherein the dynamic control signaling is configured to instruct a user equipment (UE) to determine an application delay, and the application delay is a delay for switching signal-receiving modes by the UE; determining the application delay on the basis of the dynamic control signaling; and executing a signal receiving operation by using a signal-receiving mode after switching in a second duration unit, wherein the second duration unit is determined according to the first duration unit and the application delay. The present invention solves the technical problem in related art of a network-side device and a UE lacking consistency in control channel monitoring and transmission.

18 Claims, 5 Drawing Sheets

(56) References Cited

U.S. PATENT DOCUMENTS

| | | | | |
|---|---|---|---|---|
| 2019/0394757 A1* | 12/2019 | Zhang | ................. | H04W 72/044 |
| 2023/0019993 A1* | 1/2023 | Babaei | ................. | H04W 80/02 |
| 2023/0180240 A1* | 6/2023 | Chen | .................... | H04W 16/14 |
| | | | | 455/448 |
| 2024/0032048 A1* | 1/2024 | Jeon | ..................... | H04L 5/0092 |

FOREIGN PATENT DOCUMENTS

| | | | | |
|---|---|---|---|---|
| CN | 109417762 | | 3/2019 | |
| CN | 109548062 | | 3/2019 | |
| CN | 109565338 | | 4/2019 | |
| CN | 109565338 A | * | 4/2019 | ............ H04B 17/24 |
| CN | 105379390 B | * | 6/2019 | ......... H04L 27/2602 |

OTHER PUBLICATIONS

Mediatek Inc., "Offline Summary #1 of Cross-Slot Scheduling Adaptation," 3GPP TSG RAN WG1 Meeting #99, R1-191XXXX, Nov. 2019.

Ericsson, "Procedure for cross-Slot Scheduling Enhancement," 3GPP TSG-RAN WG1 Meeting #99, Tdoc R1-1912781, Nov. 2019.

EPO, Extended European Search Report for EP Application No. 20914114.2, Jan. 3, 2023.

Qualcomm Incorporated, "Cross-slot scheduling power saving techniques," 3GPP TSG-RAN WG1 #98bis, R1-1911130, Oct. 2019.

WIPO, International Search Report and Written Opinion for PCT/CN2020/072791, Oct. 13, 2020.

\* cited by examiner

Configuring a dynamic control signaling, wherein the dynamic control signaling is configured to instruct a UE to determine an application delay, and the application delay is a delay for switching signal-receiving modes by the UE — S70

Sending the dynamic control signaling to the UE, for rendering the UE to determine the application delay on the basis of the dynamic control signaling, and employ a signal-receiving mode after being switched to execute a signal receiving operation — S72

SIGNAL PROCESSING METHOD AND APPARATUS, STORAGE MEDIUM, PROCESSOR, AND ELECTRONIC DEVICE

CROSS-REFERENCE TO RELATED APPLICATIONS

This application is a continuation-application of International (PCT) Patent Application No. PCT/CN2020/072791 filed on Jan. 17, 2020, the contents of which are herein incorporated by reference in its entirety.

TECHNICAL FIELD

The present disclosure generally relates to the technical field of communication, and in particular, to a signal processing method and apparatus, a storage medium, a processor, and an electronic device.

BACKGROUND

In the gradual progress projects of the fifth-generation technology of mobile communication networks (5G), enhancement in power-saving for user equipment (UE) is supported. In related art, the physical downlink control channel (PDCCH) is configured with periodic monitoring. The monitoring period of the downlink control channel is configured in a semi-static manner, and the reconfiguration delay is more than hundreds of milliseconds. A common situation is that most PDCCH detections do not detect data scheduling, but the UE still needs to cache data after PDCCH. That is, as soon as the PDCCH cycle is reached, the UE needs to cache data after the PDCCH even if no data scheduling is detected. In addition, a mechanism is introduced in related art to inform the UE to enter the cross-slot scheduling status using the network-side device. That is, the network-side device may inform the UE about the cross-slot scheduling status through PDCCH.

The above scheduling procedure has the technical problem of lacking consistency in control channel monitoring and transmission between a network-side device and a UE, which is resulted from the fact that as a control channel monitoring mode for the UE is configured in a semi-static manner, the control channel monitoring period of the UE can only be changed after a long semi-static reconfiguration, and there is a fuzzy time window during reconfiguration.

At present, there is no effective solution to this problem.

SUMMARY OF THE DISCLOSURE

At least some embodiments of the present disclosure provide a signal processing method and an electronic device, to at least solve the technical problem in related art of a network-side device and a UE lacking consistency in control channel monitoring and transmission due to the fact that a control channel monitoring mode for the UE is configured in a semi-static manner, and the control channel monitoring period of the UE can only be changed after a long semi-static reconfiguration, and there is a fuzzy time window during reconfiguration.

According to one embodiment of the present disclosure, a signal processing method is provided, which includes the following.

Receiving a dynamic control signaling from a network-side device in a preset period with a first duration unit, wherein the dynamic control signaling is configured to instruct a UE to determine an application delay, and the application delay is a delay for switching signal-receiving modes by the UE; determining the application delay on the basis of the dynamic control signaling; executing a signal receiving operation by using a signal-receiving mode after switching in a second duration unit, wherein the second duration unit is determined according to the first duration unit and the application delay.

According to one embodiment of the present disclosure, an electronic device is also provided, including a non-transitory memory medium and a processor, the non-transitory memory medium being configured for storing a computer program, and the processor being configured for performing the computer program to execute a signal processing method, which includes the following.

Receiving a dynamic control signaling from a network-side device in a preset period with a first duration unit, wherein the dynamic control signaling is configured to instruct a UE to determine an application delay, and the application delay is a delay for switching signal-receiving modes by the UE; determining the application delay on the basis of the dynamic control signaling; executing a signal receiving operation by using a signal-receiving mode after switching in a second duration unit, wherein the second duration unit is determined according to the first duration unit and the application delay.

According to one embodiment of the present disclosure, an electronic device is also provided, including a non-transitory memory medium and a processor, the non-transitory memory medium being configured for storing a computer program, and the processor being configured for performing the computer program to execute a signal processing method, which includes the following.

configuring a dynamic control signaling, wherein the dynamic control signaling is configured to instruct a UE to determine an application delay, and the application delay is a delay for switching signal receiving modes by the UE; sending the dynamic control signaling to the UE, for rendering the UE to determine the application delay on the basis of the dynamic control signaling, and employ a signal receiving mode after being switched to execute a signal receiving operation.

In at least some embodiments of the present disclosure, it takes the approach of receiving dynamic control signaling from a network-side device in a preset period with a first duration unit, wherein the dynamic control signaling is configured to instruct a UE to determine an application delay, and the application delay is a delay for switching signal-receiving modes by the UE, and the application delay is determined on the basis of the dynamic control signaling and a signal receiving operation is executed by using a signal-receiving mode after switching in a second duration unit, wherein the second duration unit is determined according to the first duration unit and the application delay. This achieves that a network-side device and a UE may execute signal transmitting and receiving operations within the same time unit (for example, transmitting and receiving the control channel according to the same control channel monitoring period) with an application delay determined on the basis of the dynamic control signaling. Thus, an application delay mechanism is introduced to ensure the consistency of signal transmitting and receiving between the network-side device and the UE. Thus it solves the technical problem in related art of a network-side device and a UE lacking consistency in control channel monitoring and transmission due to the fact that as a control channel monitoring mode for the UE is configured in a semi-static manner, the control channel monitoring period of the UE can only be changed after a long semi-static reconfiguration, and there is a fuzzy time window during reconfiguration.

BRIEF DESCRIPTION OF THE DRAWINGS

The appended drawings described herein are intended to provide further understanding of the present disclosure, which form part of this application. The schematic embodiments and their descriptions are intended to illustrate the present disclosure that do not contribute to any improper limitation of the present disclosure. In the appended drawings.

DETAILED DESCRIPTION

In order to help technicians in the field better understand the present disclosure, the technical solutions of embodiments of the present disclosure will be described clearly and completely below in conjunction with the accompanying drawings. The below described are only specific embodiments of the present disclosure, but not the whole set of the embodiments of the present disclosure. All other embodiments obtained by any person skilled in the art based on the embodiments from the present disclosure without making creative work should be covered within the protection scope of the present disclosure.

It should be noted that the terms "first", "second" etc. in the specification, the claims, and the appended drawings of the present disclosure are used to distinguish similar objects, but not to describe a particular order or sequence. It should be understood that the content so used may be interchangeable where appropriate, so that the described embodiments of the present disclosure may be implemented in a sequence other than those illustrated or described herein. In addition, the terms "include" and "have" and any variations of them are intended to cover non-exclusive inclusions, for example, a process, method, system, product or device that contains a series of operations or units is not necessarily limited to those operations or units clearly listed, instead, it may include other operations or units that are not clearly listed or inherent to the process, method, product or device.

Figure 1:
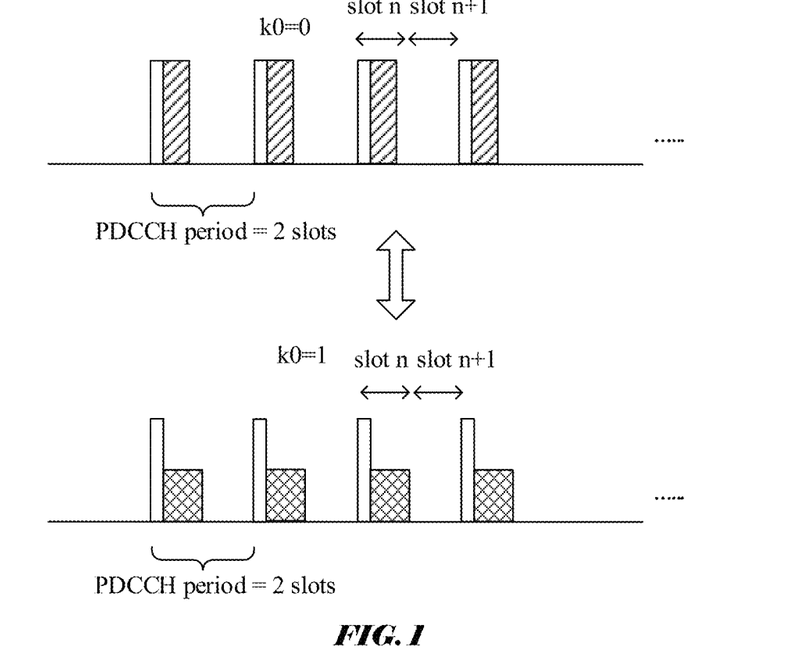
FIG. 1 is a schematic diagram of cross-slot scheduling for power-saving in the related art.

FIG. 1 shows a schematic diagram of the cross-slot scheduling for power-saving in the related art. As presented in FIG. 1, physical downlink control channel (PDCCH) is configured with periodic detection. k0 indicates the offset between the slot where the PDCCH resides and the slot where the scheduled physical downlink shared channel (PDSCH) resides. A common situation is that most PDCCH detections do not detect data scheduling, but the user equipment (UE) still needs to cache data after PDCCH. That is, as soon as the PDCCH period is reached, the UE needs to cache data after PDCCH even if no data scheduling is detected. For example, within slot n, the shaded part indicates that the radio frequency (RF) module of the UE cannot sleep and needs to cache. If the PDCCH processing time is delayed by one slot, within slot n+1, the shaded part indicates that the RF module of the UE may sleep, and the power consumption is significantly reduced. Therefore, after implementing the cross-slot scheduling, the UE could omit the cache after PDCCH, and thus turn off the RF module immediately after PDCCH.

In related art, a mechanism is introduced to inform the UE to enter the cross-slot scheduling state using the network-side device. That is, the network-side device may inform the UE of the status of cross-slot scheduling through PDCCH. In the cross-slot scheduling state, the UE may assume that the k0 value scheduled by the network-side device every time is greater than a preset threshold (a minimum k0 value). The preset threshold is preconfigured for the UE by the network-side device.

Figure 2:
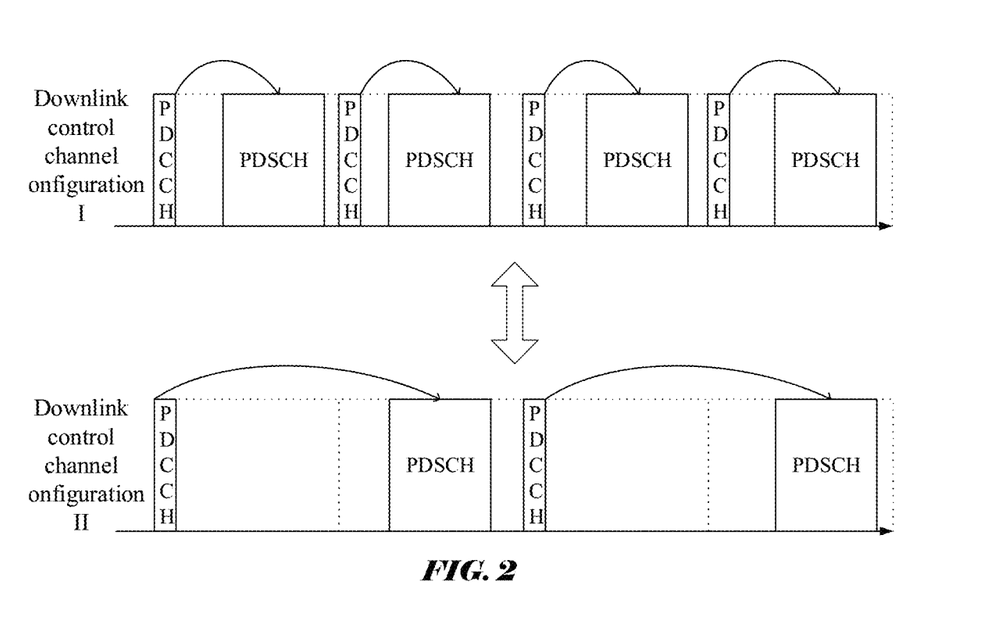
FIG. 2 is a configuration schematic diagram of the physical downlink control channel (PDCCH) and the physical downlink shared channel (PDSCH) in the related art.

As mentioned above, PDCCH is configured with periodic detection. The monitoring period of the downlink control channel is configured in a semi-static manner, and the reconfiguration delay is more than hundreds of milliseconds. FIG. 2 shows a configuration diagram of PDCCH and physical downlink shared channel (PDSCH) in the related art. As presented in FIG. 2, after the UE entering the cross-slot scheduling status, the data scheduling frequency of PDSCH decreases accordingly.

Figure 3:
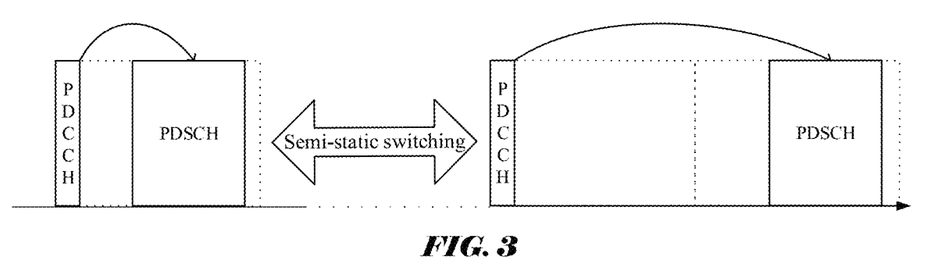
FIG. 3 is a schematic diagram of the semi-static switching in the related art.

FIG. 3 is a schematic diagram of the semi-static switching in the related art. As presented in FIG. 3, although PDCCH could be configured to directly inform a UE to enter the cross-slot power-saving mode, which better adapts to the dynamic changes of scheduling, the switching of the PDCCH monitoring period takes too long.

Figure 4:
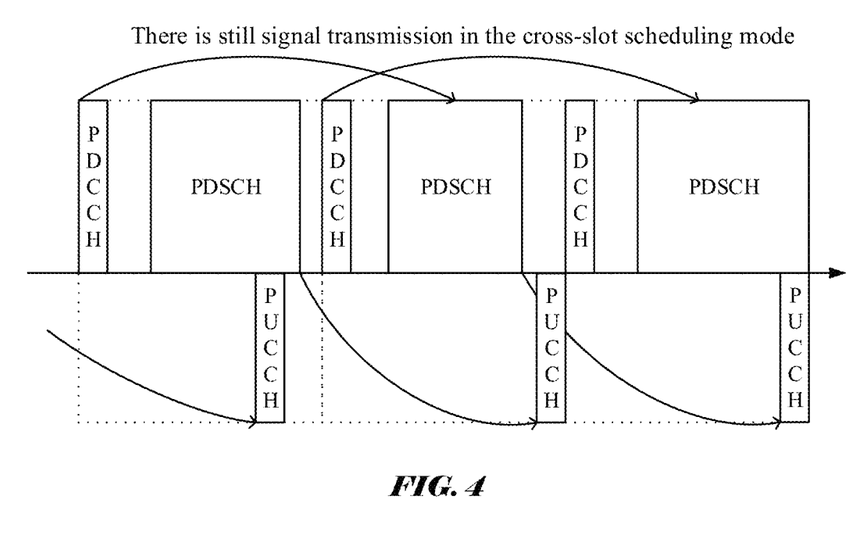
FIG. 4 is a schematic diagram of the cross-slot scheduling in the related art.

FIG. 4 is a schematic diagram of the cross-slot scheduling in the related art. As shown in FIG. 4, after switch to the cross-slot scheduling mode, the monitoring period of PDCCH is not adjusted accordingly. Even a UE receives the instructions to switch to cross-slot scheduling for power saving, the UE may still need to perform PDCCH detections in each slot. Therefore, it will be difficult for the UE to continuously shut down downlink receiving to achieve better power-saving effect.

In addition, there are some other problems to be considered in PDSCH data scheduling under PDCCH indication mode. For example, since there is a certain missing probability of PDCCH signals detection, once a UE misses a switching signal for control channel period sent by a network-side device, the consistency between the UE and the network-side device will be lacking, resulting in the continuous loss of successive downlink control signaling. In addition, the control channel detection mode is configured in a semi-static manner, and the semi-static switching takes too long, which cannot meet the demand for better power saving on the UE.

According to one embodiment of the present disclosure, a signal processing method is provided. It should be noted that the operations illustrated in the flowchart may be executed in a computer system such as a set of computer-executable instructions, and that, although the logical order is illustrated in the flowchart, under certain circumstances, the operations may be performed in a different order other than shown or described here.

The embodiments of the method may be executed on mobile terminals, computer terminals, or similar computing devices. Using the mobile terminal as an example, the mobile terminal may include one or more processors (which include, but not limited to, central processing unit (CPU), graphics processing unit (GPU), digital signal processing (DSP) chip, microcontroller unit (MCU), field programmable gate array (FPGA), and other processing apparatus) and memory medium used to store data. Alternatively, the mobile terminals may also include transmission devices, input/output devices, and display devices for communication functions. A person having ordinary skill in the art should understand that the above structure description is only for illustration and does not limit the structure of the mobile terminals. For example, a mobile terminal may also include more or fewer components than described above, or have a different configuration from what described above.

Memory medium is used to store computer programs, for example, software programs and modules of an application, such as a computer program implementation of the signal processing method in the present disclosure, and a processor is configured for performing the computer program stored in the memory medium to execute various functions and data processing, which include the implementation of the presented signal processing method. Memory medium may include high-speed random access memory or non-transitory memory, such as one or more magnetic storage devices, flash memory, or other non-transitory solid state memory. In some embodiments, memory medium may further include memory remotely set up to the processor that is connected to the mobile terminal through a network. The embodiments of the network include but are not limited to the Internet, Intranet, local area network, mobile communication network and their combinations.

Transmission devices are configured to receive or send data over a network. Specific embodiments of the network may include wireless network provided by the communication providers of the mobile terminals. In one embodiment, a transmission device includes a network interface controller (NIC), which connect to other network devices via a base station and then may communicate with the Internet. In one embodiment, the transmission device could be a RF module, which is configured for wireless communication with the Internet.

Display devices may be touch-screen type liquid crystal display (LCD) and touch display device (also known as "touch screen" or "touch display"). The LCD makes it possible for the users to interact with a user interface of a mobile terminal. In some embodiments, a mobile terminal has a graphical user interface (GUI), and a user can interact with the GUI with finger contacts and/or gestures on the touch-sensitive surface. Alternatively, human-computer interaction functions herein include creating web pages, drawing, text processing, producing electronic documents, gaming, video conferences, instant messaging, receiving and sending emails, phone interface, displaying digital videos, digital music and/or web browsing, etc. The executable instructions configured to perform the human-computer interaction functions are configured or stored in one or more processor-executable computer program products or readable storage medium.

Figure 5:
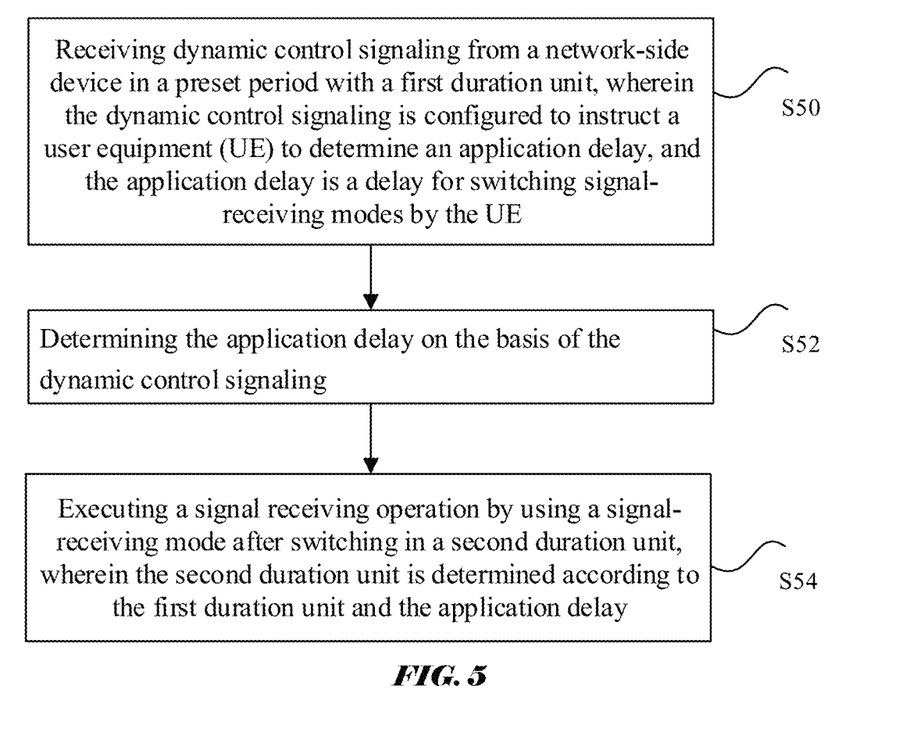
FIG. 5 is a schematic flowchart of a signal processing method according to one embodiment of the present disclosure.

A signal processing method at the above-mentioned mobile terminals is provided in the embodiment. FIG. 5 is a schematic flowchart of a signal processing method according to one embodiment of the present disclosure. As shown in FIG. 5, the method includes actions/operations in the following blocks.

At S50, the method receives a dynamic control signaling from a network-side device in a preset period with a first duration unit, wherein the dynamic control signaling is configured to instruct a UE to determine an application delay, and the application delay is a delay for switching signal-receiving modes by the UE.

At S52, the method determines the application delay on the basis of the dynamic control signaling.

At S54, the method executes a signal receiving operation by using a signal-receiving mode after switching in a second duration unit, wherein the second duration unit is determined according to the first duration unit and the application delay.

Through the operations executed in these blocks, it may take the approach of receiving dynamic control signaling from a network-side device in a preset period with a first duration unit, wherein the dynamic control signaling is configured to instruct a UE to determine an application delay, and the application delay is a delay for switching signal-receiving modes by the UE, and the application delay is determined on the basis of the dynamic control signaling and a signal receiving operation is executed by using a signal-receiving mode after switching in a second duration unit, wherein the second duration unit is determined according to the first duration unit and the application delay. This achieves that a network-side device and a UE may execute signal transmitting and receiving operations within the same time unit (for example, transmitting and receiving the control channel according to the same control channel monitoring period) with an application delay determined on the basis of the dynamic control signaling. Thus, an application delay mechanism is introduced to ensure the consistency of signal transmitting and receiving between the network-side device and the UE. Thus it solves the technical problem in related art of a network-side device and a UE lacking consistency in control channel monitoring and transmission due to the fact that as a control channel monitoring mode for the UE is configured in a semi-static manner, the control channel monitoring period of the UE can only be changed after a long semi-static reconfiguration, and there is a fuzzy time window during reconfiguration.

In at least one embodiment, time units of the first duration unit, the second duration unit and the application delay may all be slot.

In at least one embodiment, the signal-receiving modes may include but not be limited to: (1) a control channel receiving mode; or (2) a signal measuring and receiving mode.

The application scenarios of the present disclosure's embodiments are not confined to control channel receiving (for example, control channel receiving aimed to reduce the amount of PDCCH detections), the referred method of reducing control channel detections may further be applicable to other scenarios in need of power saving, for example, the signal-measuring related receiving. The implementation of the present disclosure will be further described in detail with the control channel receiving as an example.

It should be noted that the implementation also applies to other scenarios of saving power consumption.

In related art, usually it will only use the dynamic control signaling to change the minimum k value for cross-slot scheduling. However, the PDCCH monitoring period cannot be changed in time accordingly, and due to the high power consumption of PDCCH monitoring on the UE, it is difficult to achieve better effect of power saving. In addition, if a UE dynamically adjusts the control channel monitoring period, it is prone to produce a fuzzy time window. In this fuzzy time window, the control channel cannot be monitored, which leads to the lack of consistency of the transmission and detection of the control channel between the network-side device and the UE. Therefore, the embodiment of the present disclosure introduces the mechanism of using the dynamic control signaling to trigger the UE to determine the application delay, so that the network-side device may trigger the UE more flexibly to achieve fine power saving, and it does not increase the complexity of the control channel format. In addition, it is possible to indicate the saving signals on each carrier without adding special energy saving signals, and without the need to configure additional special control signaling for power-saving physical layer signals.

The preset period may be preconfigured with high-level signaling. In control channel receiving, although the transmission period of the downlink control channel is configured in the unit of slot, the downlink control channel does not occupy the entire first duration unit for transmission, but usually occupies part of the entire first duration unit for transmission. If the slot is divided into 14 symbols in the time dimension, the downlink control channel will normally occupy 1-3 of them for transmission. Therefore, if a UE receives the dynamic control signaling in slot n and determines that the application delay is x slots, the UE will use the switched signal-receiving mode for signals receiving starting from slot n+x. For example, the UE will use the new monitoring period and monitoring position to perform PDCCH detection from slot n+x.

Figure 6:
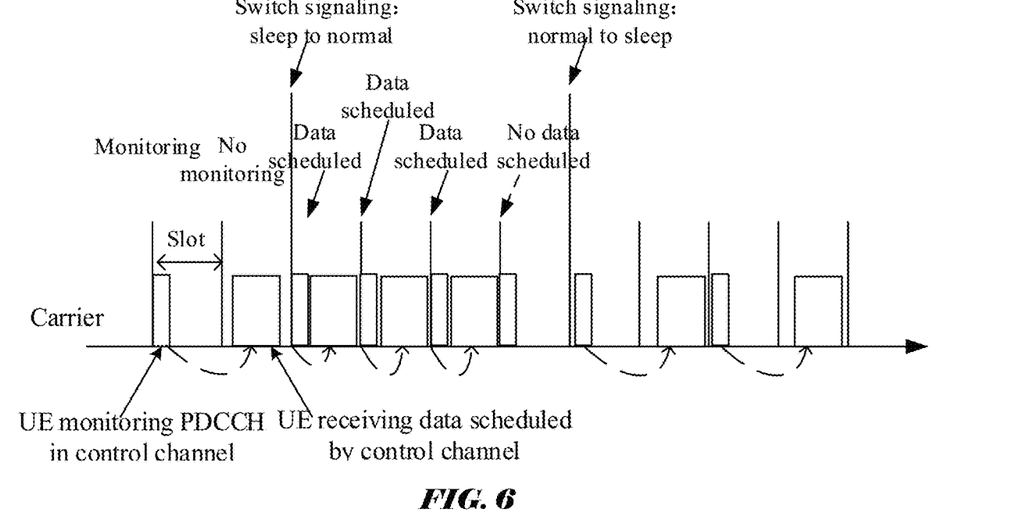
FIG. 6 is a schematic diagram of a switching status manner in which a user equipment (UE) lengthens or shortens the PDCCH monitoring period on a carrier according to one embodiment of the present disclosure.

In at least one embodiment, the dynamic control signaling could be downlink control information (DCI). FIG. 6 is a schematic diagram of a switching status manner in which a user equipment (UE) lengthens or shortens the PDCCH monitoring period on a carrier according to one embodiment of the present disclosure. As shown in FIG. 6, the switching may be triggered by a PDCCH DCI on the carrier. The DCI may also be configured to schedule data. In this embodiment, the PDCCH monitoring period=Minimum k0+1 is achieved.

In at least one embodiment, at S50, after receiving the dynamic control signaling from the network-side device in the first duration unit, the method may include actions/operations in the following.

At S51, the method switches from a source PDCCH search space (SS) group to a target PDCCH SS group by a trigger of at least one bit of the dynamic control signaling, wherein the source PDCCH SS group includes at least one source SS set, and the target PDCCH SS group includes at least one target SS set; or, switches from a source parameter to a target parameter of a same PDCCH SS group by a trigger of at least one bit of the dynamic control signaling, wherein the source parameter includes at least one of a source monitoring period, and a source monitoring position; and the target parameter includes at least one of a target monitoring period, and a target monitoring position.

The network-side device may configure at least one bit in the dynamic control signaling to trigger the UE to switch from a source PDCCH SS group to a target PDCCH SS group. The source PDCCH SS group includes at least one source SS set, and the target PDCCH SS group includes at least one target SS set. In the process of switching between different PDCCH SS groups, the PDCCH SS group after switching is the target PDCCH SS group, while the PDCCH SS group before switching is the source PDCCH SS group.

In addition, the network-side device may configure at least one bit in the dynamic control signaling to trigger the UE to switch from a source parameter to a target parameter of a same PDCCH SS group. The source parameter includes at least one of a source monitoring period, and a source monitoring position; and the target parameter includes at least one of a target monitoring period, and a target monitoring position. In the process of switching between different parameters of a same PDCCH SS group, the parameter after switching is the target parameter, while the parameter before switching is the source parameter. It should be noted that the longer the monitoring period, the better the power saving effect of the UE.

In at least one embodiment, in response to the source PDCCH SS group being triggered to switch to the target PDCCH SS group, at S52, the determining the application delay on the basis of the dynamic control signaling may include actions/operations in the following.

At S521, the method determines a value of a minimum monitoring period in at least one source SS set as the application delay by a trigger of the dynamic control signaling.

In the process of switching between different PDCCH SS groups, a value of a minimum monitoring period in at least one source SS set is determined as the application delay by a trigger of the dynamic control signaling. For example, a UE switches from a source PDCCH SS group A to a target PDCCH SS group B. The source PDCCH SS group A includes source SS Set 1, source SS Set 2, and source SS Set 3. In this case, a value of the minimum monitoring periods among source SS Set 1, source SS Set 2 and source SS Set 3 is determined as the application delay.

At S522, the method determines a value of a maximum monitoring period in at least one source SS set as the application delay by a trigger of the dynamic control signaling.

In the process of switching between different PDCCH SS groups, determine a value of a maximum monitoring period in at least one source SS set is determined as the application delay by a trigger of the dynamic control signaling. For example, a UE switches from a source PDCCH SS group A to a target PDCCH SS group B. The source PDCCH SS group A includes source SS Set 1, source SS Set 2, and source SS Set 3. In this case, a value of the maximum monitoring periods among source SS Set 1, source SS Set 2, and source SS Set 3 is determined as the application delay.

At S523, the method determines a value of a minimum monitoring period in at least one target SS set as the application delay by a trigger of the dynamic control signaling.

In the process of switching between different PDCCH SS groups, a value of a minimum monitoring period in at least one target SS set is determined as the application delay by a trigger of the dynamic control signaling. For example, a UE switches from a source PDCCH SS group A to a target PDCCH SS group B. The target PDCCH SS group B includes target SS Set 1, target SS Set 2, and target SS Set 3. In this case, a value of the minimum monitoring periods among target SS Set 1, target SS Set 2 and target SS Set 3 is determined as the application delay.

At S524, the method determines a value of a maximum monitoring period in at least one target SS set as the application delay by a trigger of the dynamic control signaling.

In the process of switching between different PDCCH SS groups, a value of a maximum monitoring period in at least one target SS set is determined as the application delay by a trigger of the dynamic control signaling. For example, a UE switches from a source PDCCH SS group A to a target PDCCH SS group B. The target PDCCH SS group B includes target SS Set 1, target SS Set 2, and target SS Set 3. In this case, a value of the maximum monitoring periods among target SS Set 1, target SS Set 2, and target SS Set 3 is determined as the application delay.

In at least one embodiment, in response to the source PDCCH SS group being triggered to switch to the target PDCCH SS group, and a source minimum offset value (source minimum k0 value) being triggered to switch to a target minimum offset value (target minimum k0 value), at S52, the determining the application delay on the basis of the dynamic control signaling may include actions/operations in the following.

At S525, the method determines the application delay on the basis of the source minimum offset value by a trigger of the dynamic control signaling.

That is, the UE configures the application delay on the basis of the source minimum k0 value.

At S526, the method determines the application delay on the basis of the target minimum offset value by a trigger of the dynamic control signaling.

That is, the UE configures the application delay on the basis of the target minimum k0 value.

In at least one embodiment, in the case of multi-carrier scheduling, in response to switching across carriers or across bandwidth parts (BWP), a minimum offset value is configured on a scheduled carrier, a monitoring period of SS set is configured on a scheduling carrier, and the application delay is switched from a scheduled carrier to a scheduling carrier. At this point, the UE may set a first parameter, a second parameter, and a third parameter as input parameters of a preset function to calculate the application delay. The first parameter is a minimum offset value of active BWP of a scheduled carrier, the second parameter is a subcarrier spacing (SCS) coefficient of active BWP of the scheduling carrier, the third parameter is a SCS coefficient of active BWP of the scheduled carrier; and the preset function is a round-up or round-down function.

That is, the UE may determine the application delay based on the formula:

$$f(minK0_{scheduled} * 2^{\mu_{scheduling}} / 2^{\mu_{scheduled}}) - 1;$$

In the formula, $minK0_{scheduled}$ is a minimum k0 value of active BWP of a scheduled carrier $\mu_{scheduling}$ is a SCS coefficient of active BWP of the scheduling carrier $\mu_{scheduled}$ is a SCS coefficient of active BWP of the scheduled carrier. f( ) is a preset function such as a round-up function or a round-down function.

In at least one embodiment, at S52, the determining the application delay on the basis of the dynamic control signaling may include actions/operations in the following.

At S527, the method determines a preconfigured value, which is set by the network-side device for the UE, as the application delay, in response to a trigger of the dynamic control signaling.

In addition to the above mentioned method of configuring at least one bit in the dynamic control signaling to trigger a UE to switch from a source PDCCH SS group to a target PDCCH SS group, or to trigger a UE to switch from a source parameter to a target parameter of a same PDCCH SS group, the network-side device may also set a preconfigured value, so that a UE may directly set the application delay as the preconfigured value, which is set by the network-side device for the UE.

In at least one embodiment, the above mentioned method may further include an action/operation in the following.

At S55, the method rolls back to the source PDCCH SS group, in response to not receiving a to-be-transmitted control signaling to the UE from the target PDCCH SS group before a timer preconfigured by the network-side device expires.

For how the UE handles after the loss of switching signaling, a timer may be started when a value of a bit in the dynamic control signaling corresponding to the timer changes. That is, the timer isn't started, in response to the value of the bit not changing during two consecutive dynamic control signaling transmissions. Only when the value of the bit changes, the timer is started. The timer is configured for rolling back to the source PDCCH SS group, in response to not receiving a to-be-transmitted control signaling to the UE from the target PDCCH SS group before the timer preconfigured by the network-side device expires, in the process of switching between different PDCCH SS groups.

In at least one embodiment, the above mentioned method may include an action/operation in the following.

At S56, the method rolls back to a default PDCCH SS group preconfigured by the network-side device, in response to not receiving a to-be-transmitted control signaling to the UE from the target PDCCH SS group before a timer preconfigured by the network-side device expires.

In the process of switching between different PDCCH SS groups, in response to not receiving a to-be-transmitted control signaling to the UE from the target PDCCH SS group before a timer preconfigured by the network-side device expires, the UE may also roll back to a default PDCCH SS group preconfigured by the network-side device, in addition to rolling back to the source PDCCH SS group.

In at least one embodiment, the above mentioned method may include an action/operation in the following.

At S57, the method updates or resets a timer, in response to receiving a to-be-transmitted control signaling to the UE from the target PDCCH SS group before a timer preconfigured by the network-side device expires.

In the process of switching between different PDCCH SS groups, in response to receiving a to-be-transmitted control signaling to the UE from the target PDCCH SS group before a timer preconfigured by the network-side device expires, the timer is updated (from a first timer value to a second timer value) or reset (from the current timer value to a default timer value).

According to one embodiment of the present disclosure, another signal processing method is provided. It should be noted that the operations in the blocks illustrated in the flowchart may be executed in a computer system such as a set of computer-executable instructions, and that, although a logical order is illustrated in the flowchart, under certain circumstances, The operations may be performed in a different order other than shown or described here.

Figure 7:
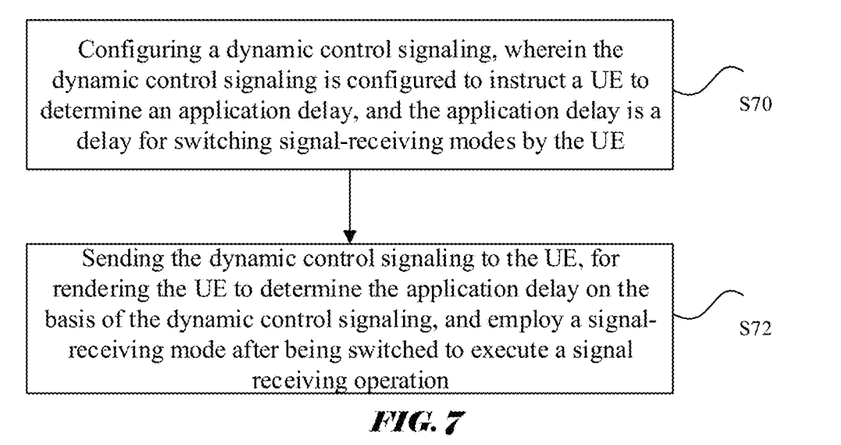
FIG. 7 is a schematic flowchart of another signal processing method according to one embodiment of the present disclosure.

A signal processing method at a network-side device is provided in this embodiment, FIG. 7 is a schematic flowchart of the signal processing method according to one embodiment of the present disclosure. As shown in FIG. 7, the method includes actions/operations in the following blocks.

At S70, the method configures a dynamic control signaling, wherein the dynamic control signaling is configured to instruct a UE to determine an application delay, and the application delay is a delay for switching signal-receiving modes by the UE.

At S72, the method sends the dynamic control signaling to the UE, for rendering the UE to determine the application delay on the basis of the dynamic control signaling, and employ a signal-receiving mode after being switched to execute a signal receiving operation.

Through the operations executed in these blocks, it may take the approach of configuring a dynamic control signaling, wherein the dynamic control signaling is configured to instruct a UE to determine an application delay, and the application delay is a delay for switching signal-receiving modes by the UE, and the dynamic control signaling is sent to the UE, for rendering the UE to determine the application delay on the basis of the dynamic control signaling and employ a signal-receiving mode after being switched to execute a signal receiving operation. This achieves that a network-side device and a UE may execute signal transmitting and receiving operations within the same time unit (for example, transmitting and receiving the control channel according to the same control channel monitoring period) with an application delay determined on the basis of the dynamic control signaling. Thus, an application delay mechanism is introduced to ensure the consistency of signal transmitting and receiving between the network-side device and the UE. Thus it solves the technical problem in related art of a network-side device and a UE lacking consistency in control channel monitoring and transmission due to the fact that as a control channel monitoring mode for the UE is configured in a semi-static manner, the control channel monitoring period of the UE can only be changed after a long semi-static reconfiguration, and there is a fuzzy time window during reconfiguration.

In at least one embodiment, time unit of the application delay is slot.

In at least one embodiment, the signal-receiving modes may include but not be limited to: (1) a control channel receiving mode; or (2) a signal measuring and receiving mode.

The application scenarios of the present disclosure's embodiments are not confined to control channel receiving (for example, control channel receiving aimed to reduce the amount of PDCCH detections), the referred method of reducing control channel detections may further be applicable to other scenarios in need of power saving, for example, the signal-measuring related receiving. The implementation of the present disclosure will be further described in detail with the control channel receiving as an example. It should be noted that the implementation also applies to other scenarios of saving power consumption.

In at least one embodiment, at S70, the configuring the dynamic control signaling may include actions/operations in the following.

At S701, the method configures at least one bit in the dynamic control signaling, wherein the at least one bit is configured for triggering the UE to switch from a source PDCCH SS group to a target PDCCH SS group, the source PDCCH SS group includes at least one source SS set, and the target PDCCH SS group includes at least one target SS set.

The network-side device may configure at least one bit in the dynamic control signaling to trigger the UE to switch from a source PDCCH SS group to a target PDCCH SS group. The source PDCCH SS group includes at least one source PDCCH SS set, and the target PDCCH SS group includes at least one target PDCCH SS set. In the process of switching between different PDCCH SS groups, the PDCCH SS group after switching is the target PDCCH SS group, while the PDCCH SS group before switching is the source PDCCH SS group.

At S702, the method configures at least one bit in the dynamic control signaling, wherein the at least one bit is configured for triggering the UE to switch from a source parameter to a target parameter of a same PDCCH SS group, the source parameter includes at least one of a source monitoring period, and a source monitoring position; and the target parameter includes at least one of a target monitoring period, and a target monitoring position.

The network-side device may configure at least one bit in the dynamic control signaling to trigger the UE to switch from a source parameter to a target parameter of a same PDCCH SS group. The source parameter includes at least one of a source monitoring period, and a source monitoring position; and the target parameter includes at least one of a target monitoring period, and a target monitoring position. In the process of switching between different parameters of a same PDCCH SS group, the parameter after switching is the target parameter, while the parameter before switching is the source parameter.

In at least one embodiment, in response to the source PDCCH SS group being triggered to switch to the target PDCCH SS group, at S70, the configuring a dynamic control signaling may include actions/operations in the following.

At S703, the method configures a value of a minimum monitoring period in at least one source SS set as the application delay in the dynamic control signaling.

In the process of switching between different PDCCH SS groups, a value of a minimum monitoring period in at least one source SS set is determined as the application delay by a trigger of the dynamic control signaling. For example, a UE switches from a source PDCCH SS group A to a target PDCCH SS group B. The source PDCCH SS group A includes source SS Set 1, source SS Set 2, and source SS Set 3. In this case, a value of the minimum monitoring periods among source SS Set 1, source SS Set 2 and source SS Set 3 is determined as the application delay.

At S704, the method configures a value of a maximum monitoring period in at least one source SS set as the application delay in the dynamic control signaling.

In the process of switching between different PDCCH SS groups, a value of a maximum monitoring period in at least one source SS set is determined as the application delay by a trigger of the dynamic control signaling. For example, a UE switches from a source PDCCH SS group A to a target PDCCH SS group B. The source PDCCH SS group A includes source SS Set 1, source SS Set 2, and source SS Set 3. In this case, a value of the maximum monitoring periods among source SS Set 1, source SS Set 2, and source SS Set 3 is determined as the application delay.

At S705, the method configures a value of a minimum monitoring period in at least one target SS set as the application delay in the dynamic control signaling.

In the process of switching between different PDCCH SS groups, a value of a minimum monitoring period in at least one target SS set is determined as the application delay by a trigger of the dynamic control signaling. For example, a UE switches from a source PDCCH SS group A to a target PDCCH SS group B. The target PDCCH SS group B includes target SS Set 1, target SS Set 2, and target SS Set 3. In this case, a value of the minimum monitoring periods among target SS Set 1, target SS Set 2 and target SS Set 3 is determined as the application delay.

At S706, the method configures a value of a maximum monitoring period in at least one target SS set as the application delay in the dynamic control signaling.

In the process of switching between different PDCCH SS groups, a value of a maximum monitoring period in at least one target SS set is determined as the application delay by a trigger of the dynamic control signaling. For example, a UE switches from a source PDCCH SS group A to a target PDCCH SS group B. The target PDCCH SS group B includes target SS Set 1, target SS Set 2, and target SS Set 3. In this case, a value of the maximum monitoring periods among target SS Set 1, target SS Set 2, and target SS Set 3 is determined as the application delay.

In at least one embodiment, in response to the source PDCCH SS group being triggered to switch to the target PDCCH SS group, and a source minimum offset value (source minimum k0 value) being triggered to switch to a target minimum offset value (target minimum k0 value). At S70, the configuring a dynamic control signaling may include actions/operations in the following.

At S707, the method configures the source minimum offset value as the application delay in the dynamic control signaling.

That is, a UE may determine the application delay using the source minimum k0 value.

At S708, the method configures the target minimum offset value as the application delay in the dynamic control signaling.

That is, a UE may determine the application delay using the target minimum k0 value.

In at least one embodiment, at S70, configuring a dynamic control signaling may include an action/operation in the following.

At S709, the method configures a preconfigured value as the application delay in the dynamic control signaling.

In addition to the above mentioned method of configuring at least one bit in the dynamic control signaling to trigger a UE to switch from a source PDCCH SS group to a target PDCCH SS group, or to trigger a UE to switch from a source parameter to a target parameter of a same PDCCH SS group, the network-side device may also set a preconfigured value, so when triggered by the dynamic control signaling, a UE may directly set the application delay as the preconfigured value, which is set by the network-side device for the UE.

In at least one embodiment, the above-mentioned method may further include an action/operation in the following.

At S73, the method configures a timer for the UE, for controlling the UE to roll back to the source PDCCH SS group in response to not receiving a to-be-transmitted control signaling from the target PDCCH SS group before the timer expires; or for triggering the UE to update or reset the timer in response to receiving the to-be-transmitted control signaling from the target PDCCH SS group before the timer expires.

For how the UE handles after the loss of switching signaling, a timer may be started when a value of a bit in the dynamic control signaling corresponding to the timer changes. That is, the timer isn't started, in response to the value of the bit not changing during two consecutive dynamic control signaling transmissions. Only when the value of the bit changes, the timer is started. The timer is configured for rolling back to the source PDCCH SS group, in response to not receiving a to-be-transmitted control signaling to the UE from the target PDCCH SS group before the timer preconfigured by the network-side device expires, in the process of switching between different PDCCH SS groups.

In the process of switching between different PDCCH SS groups, in response to receiving a to-be-transmitted control signaling to the UE from the target PDCCH SS group before a timer preconfigured by the network-side device expires, the timer is updated (from a first timer value to a second timer value) or reset (from the current timer value to a default timer value).

In at least one embodiment, the above-mentioned method may further include an action/operation in the following.

At S74, the method configures a timer and a default PDCCH SS group for the UE, for controlling the UE to roll back to the default PDCCH SS group in response to not receiving a to-be-transmitted control signaling from the target PDCCH SS group before the timer expires.

In the process of switching between different PDCCH SS groups, in response to not receiving a to-be-transmitted control signaling to the UE from the target PDCCH SS group before a timer preconfigured by the network-side device expires, a UE may also roll back to the default PDCCH SS group preconfigured by the network-side device, in addition to rolling back to the source PDCCH SS group.

With the above description of the embodiments, technicians in the related art could clearly understand that the methods according to the above embodiments may be implemented with the use of software and necessary general hardware platform, of course, it may also be implemented with hardware, but in many cases the former is the better implementation. Based on this understanding, the essence or the part that contributes to the existing technology of the technical proposal of the present disclosure may be manifested in the form of a software product, where the computer software product is stored in a storage medium (such as read-only memory (ROM), random access memory (RAM), magnetic disk, or compact disk (CD)), including several instructions to make a terminal device (could be a mobile phone, a computer, a server, or a network-side device, etc.) execute the methods described in the embodiments of the present disclosure.

A receiving-signal processing apparatus is provided in this embodiment, the apparatus is configured to implement the above described embodiments and implementations, which is not repeated here for brevity. As used below, the term "module" may be a combination of software and/or hardware that implements a predetermined function. Although the apparatus described in the following embodiments is better implemented in software, implementations of hardware, or a combination of software and hardware, are also possible and envisaged.

Figure 8:
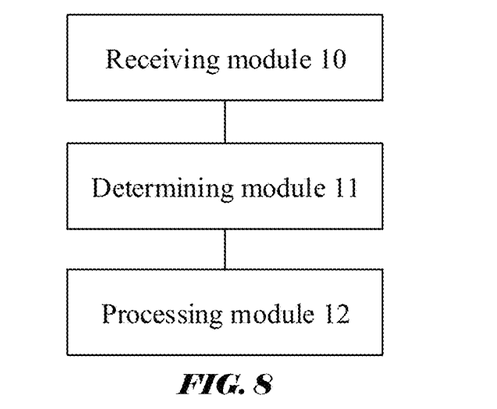
FIG. 8 is a schematic diagram of a receiving-signal processing apparatus according to one embodiment of the present disclosure.

FIG. 8 is a schematic diagram of a receiving-signal processing apparatus according to one embodiment of the present disclosure. As presented in FIG. 8, the apparatus includes: a receiving module 10, configured for receiving a dynamic control signaling from a network-side device in a preset period with a first duration unit, wherein the dynamic control signaling is configured to instruct a UE to determine an application delay, and the application delay is a delay for switching signal-receiving modes by the UE; a determining module 11, configured for determining the application delay on the basis of the dynamic control signaling; a processing module 12, configured for executing a signal receiving operation by using a signal-receiving mode after switching in a second duration unit, wherein the second duration unit is determined according to the first duration unit and the application delay.

In at least one embodiment, signal-receiving modes may include a control channel receiving mode; or, a signal measuring and receiving mode.

Figure 9:
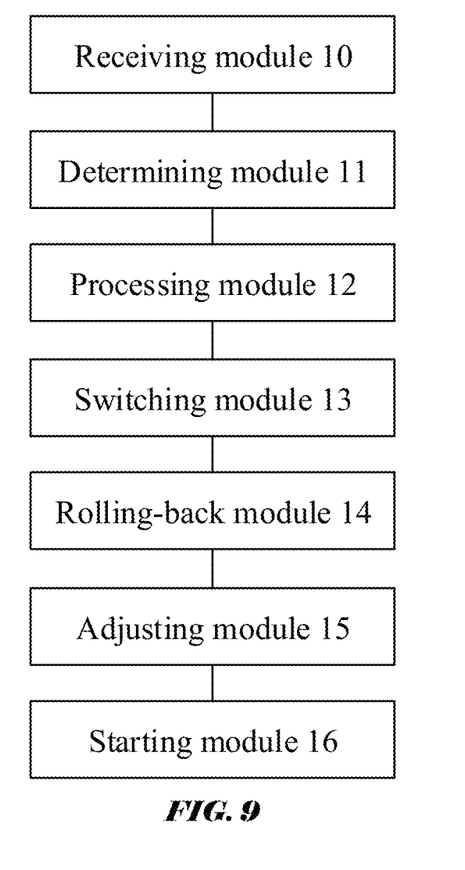
FIG. 9 is a schematic diagram of a receiving-signal processing apparatus according to one embodiment of the present disclosure.

Alternatively, FIG. 9 is a schematic diagram of a receiving-signal processing apparatus according to one embodiment of the present disclosure. As shown in FIG. 9, in addition to all the modules shown in FIG. 8, this apparatus also includes: a switching module 13, configured for switching from a source PDCCH SS group to a target PDCCH SS group by a trigger of at least one bit of the dynamic control signaling, wherein the source PDCCH SS group includes at least one source SS set, and the target PDCCH SS group includes at least one target SS set; or, switching from a source parameter to a target parameter of a same PDCCH SS group by a trigger of at least one bit of the dynamic control signaling, wherein the source parameter includes at least one of a source monitoring period, and a source monitoring position; and the target parameters includes at least one of a target monitoring period, and a target monitoring position.

In at least one embodiment, the determining module 11 is configured for determining a value of a minimum monitoring period in at least one source SS set as the application delay by a trigger of the dynamic control signaling; or, determining a value of a maximum monitoring period in at least one source SS set as the application delay by a trigger of the dynamic control signaling; or, determining a value of a minimum monitoring period in at least one target SS set as the application delay by a trigger of the dynamic control signaling; or, determining a value of a maximum monitoring period in at least one target SS set as the application delay by a trigger of the dynamic control signaling.

In at least one embodiment, the determining module 11 is configured for determining the application delay on the basis of the source minimum offset value by a trigger of the dynamic control signaling; or, determining the application delay on the basis of the target minimum offset value by a trigger of the dynamic control signaling.

In at least one embodiment, the determining module 11 is configured for configuring a minimum offset value on a scheduled carrier when switching across carriers or across BWP.

In at least one embodiment, the determining module 11 is configured for configuring a monitoring period of SS set on a scheduling carrier when switching across carriers or across BWP.

In at least one embodiment, the determining module 11 is configured for switching the application delay from a scheduled carrier to a scheduling carrier when switching across carriers or across BWP.

In at least one embodiment, the determining module 11 is configured for configuring a first parameter, a second parameter, and a third parameter as input parameters of a preset function to calculate the application delay when switching across carriers or across BWP. The first parameter is a minimum offset value of active BWP of a scheduled carrier, the second parameter is a SCS coefficient of active BWP of a scheduling carrier, and the third parameter is a SCS coefficient of active BWP of the scheduled carrier. The preset function is a round-up or round-down function.

In at least one embodiment, the determining module 11 is configured for determining a preconfigured value, which is set by the network-side device for the UE, as the application delay, in response to a trigger of the dynamic control signaling.

In at least one embodiment, time units of the first duration unit, the second duration unit, and the application delay are slot.

In at least one embodiment, as shown in FIG. 9, in addition to all the modules shown in FIG. 8, this apparatus also includes: a rolling-back module 14, configured for rolling back to the source PDCCH SS group, in response to not receiving a to-be-transmitted control signaling to the UE from the target PDCCH SS group before a timer preconfigured by the network-side device expires; or, rolling back to a default PDCCH SS group preconfigured by the network-side device, in response to not receiving a to-be-transmitted control signaling to the UE from the target PDCCH SS group before a timer preconfigured by the network-side device expires.

In at least one embodiment, as shown in FIG. 9, in addition to all the modules shown in FIG. 8, this apparatus also includes: an adjusting module 15, configured for updating or resetting the timer, in response to receiving a to-be-transmitted control signaling to the UE from the target PDCCH SS group before a timer preconfigured by the network-side device expires.

In at least one embodiment, as shown in FIG. 9, in addition to all the modules shown in FIG. 8, this apparatus also includes: a starting module 16, configured for starting the timer, in response to a value of a bit in the dynamic control signaling corresponding to the timer changing.

Another receiving-signal processing apparatus is provided in this embodiment, the apparatus is configured to implement the above described embodiments and implementations, which is not repeated here for brevity. As used below, the term "module" may be a combination of software and/or hardware that implements a predetermined function. Although the apparatus described in the following embodiments is better implemented in software, implementations of hardware, or a combination of software and hardware, are also possible and envisaged.

Figure 10:
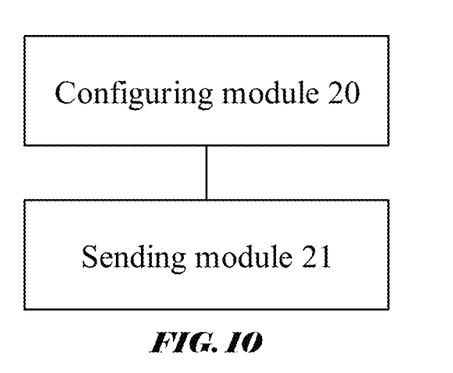
FIG. 10 is a schematic diagram of another receiving-signal processing apparatus according to one embodiment of the present disclosure.

FIG. 10 is a schematic diagram of another receiving-signal processing apparatus according to one embodiment of the present disclosure. As presented in FIG. 10, the apparatus includes: a configuring module 20, configured for configuring a dynamic control signaling, wherein the dynamic control signaling is configured to instruct a UE to determine an application delay, and the application delay is a delay for switching signal-receiving modes by the UE; a sending module 21, configured for sending the dynamic control signaling to the UE, for rendering the UE to determine the application delay on the basis of the dynamic control signaling, and employ a signal-receiving mode after being switched to execute a signal receiving operation.

In at least one embodiment, signal-receiving modes may include a control channel receiving mode; or, a signal measuring and receiving mode.

In at least one embodiment, the configuring module 20 is configured for configuring at least one bit in the dynamic control signaling. The at least one bit is configured for triggering the UE to switch from a source PDCCH SS group to a target PDCCH SS group. The source PDCCH SS group includes at least one source SS set, and the target PDCCH SS group includes at least one target SS set. alternatively, the at least one bit is configured for triggering the UE to switch from a source parameter to a target parameter of a same PDCCH SS group. The source parameter includes at least one of a source monitoring period, and a source monitoring position; and the target parameter includes at least one of a target monitoring period, and a target monitoring position.

In at least one embodiment, the configuring module 20 is configured for configuring a value of a minimum monitoring period in at least one source SS set as the application delay in the dynamic control signaling; or, configuring a value of a maximum monitoring period in at least one source SS set as the application delay in the dynamic control signaling; or, configuring a value of a minimum monitoring period in at least one target SS set as the application delay in the dynamic control signaling; or, configuring a value of a maximum monitoring period in at least one target SS set as the application delay in the dynamic control signaling.

In at least one embodiment, the configuring module 20 is configured for configuring the source minimum offset value as the application delay in the dynamic control signaling; or, configuring the target minimum offset value as the application delay in the dynamic control signaling.

In at least one embodiment, the configuring module 20 is configured for configuring a preconfigured value as the application delay in the dynamic control signaling.

In at least one embodiment, the configuring module 20 is also configured for configuring a timer, for controlling the UE to roll back to the source PDCCH SS group in response to not receiving a to-be-transmitted control signaling from the target PDCCH SS group before the timer expires; or for triggering the UE to update or reset the timer in response to receiving the to-be-transmitted control signaling from the target PDCCH SS group before the timer expires.

In at least one embodiment, the configuring module 20 is also configured for configuring a timer and a default PDCCH SS group, for controlling the UE to roll back to the default PDCCH SS group in response to not receiving a to-be-transmitted control signaling from the target PDCCH SS group before the timer expires.

It should be noted that, the above described modules may be implemented by software or hardware. For the latter, it may be implemented in but not limited to the following way: the modules are all located in the same processor; or, the modules may be located in different processors in any form of combinations.

Embodiments of the present disclosure also provide a storage medium, in which a computer program is stored, wherein the computer program is configured to be performed to execute the operations of any of the above described embodiments.

Alternatively, in this embodiment, the storage medium may be configured to store a computer program configured to execute actions/operations in the following.

S1, receiving a dynamic control signaling from a network-side device in a preset period with a first duration unit, wherein the dynamic control signaling is configured to instruct a UE to determine an application delay, and the application delay is a delay for switching signal-receiving modes by the UE.

S2, determining the application delay on the basis of the dynamic control signaling.

S3, executing a signal receiving operation by using a signal-receiving mode after switching in a second duration unit, wherein the second duration unit is determined according to the first duration unit and the application delay.

In at least one embodiment, the storage medium may also be configured to store a computer program configured to execute actions/operations in the following.

S1, configuring a dynamic control signaling, wherein the dynamic control signaling is configured to instruct a UE to determine an application delay, and the application delay is a delay for switching signal-receiving modes by the UE.

S2, sending the dynamic control signaling to the UE, for rendering the UE to determine the application delay on the basis of the dynamic control signaling, and employ a signal-receiving mode after being switched to execute a signal receiving operation.

Alternatively, in this embodiment, the storage medium may include, but is not limited to, any medium that can store computer programs, such as USB flash disks, ROM, RAM, mobile hard disks, magnetic disks, or CDs.

Embodiments of the present disclosure also provide an electronic device, comprising a non-transitory memory medium and a processor. The non-transitory memory medium stores a computer program, and the processor is configured for performing the computer program to execute the operations of any the above described embodiments.

In at least one embodiment, the electronic device may include a transmission device and an input/output device. The transmission device is connected to the processor, and the input/output device is connected to the processor.

Alternatively, in this embodiment, the processor may be configured to execute actions/operations in the following by performing a computer program.

S1, receiving a dynamic control signaling from a network-side device in a preset period with a first duration unit, wherein the dynamic control signaling is configured to instruct a UE to determine an application delay, and the application delay is a delay for switching signal-receiving modes by the UE.

S2, determining the application delay on the basis of the dynamic control signaling.

S3, executing a signal receiving operation by using a signal-receiving mode after switching in a second duration unit, wherein the second duration unit is determined according to the first duration unit and the application delay.

Alternatively, in this embodiment, the processor may be configured to execute actions/operations in the following by performing a computer program.

S1, configuring a dynamic control signaling, wherein the dynamic control signaling is configured to instruct a UE to determine an application delay, and the application delay is a delay for switching signal-receiving modes by the UE.

S2, sending the dynamic control signaling to the UE, for rendering the UE to determine the application delay on the basis of the dynamic control signaling, and employ a signal-receiving mode after being switched to execute a signal receiving operation.

Alternatively, specific examples of this embodiment may be obtained by referring to the above described embodiments and their implementations, which is not repeated here for brevity.

The order of above described embodiments of the present disclosure is only for the purpose of description and does not represent the merits and demerits of embodiments.

In the above embodiments of the present disclosure, the description of each embodiment has its own emphasis. For the part not detailed in one embodiment, please refer to the relevant description of other embodiments.

With the provided embodiments of the present disclosure, it should be understood that the disclosed technical content may be implemented in other ways. Wherein the above described embodiments and devices are only for demonstration, the partition of the described units, for example, may be a partition based on the logical functions, the actual implementation may have other partition criteria, such as multiple units or components may be combined or integrated into another system, or some features may be ignored, or not implemented. In addition, the displayed or discussed mutual coupling, direct coupling, or communication connection may be indirect coupling or communication connection through some interfaces, units or modules and may be in electrical or other forms.

The units described as separate components may or may not be physically separated, and the components displayed as units may or may not be physical units. That is, they may be located at one position, or they may be distributed over multiple units. Some or all of the units may be selected according to actual needs to achieve the objectives of the implementation of the embodiment.

In addition, each functional units in each embodiment of the present disclosure may be integrated into one processing unit, or each unit may physically exist independently, or two or more units may be integrated into one unit. The above integrated units may be implemented in the form of hardware, or in the form of software functional units.

The integrated units may be stored in a computer-readable storage medium if implemented in the form of software functional units and sold or used as an independent product. Based on this understanding, the technical solution of the present disclosure essentially, or a part that contributes to the existing technology, or all or part of the technical solution may be embodied in the form of a software product, where the computer software product is stored in a storage medium, including several instructions causing computing device (could be a personal computer, a server, or a network-side device, etc.) execute all or part of the operations in the methods described in the various embodiments of the present disclosure. And the storage medium may include: any medium that can store computer programs, such as USB flash disks, ROM, RAM, mobile hard disks, magnetic disks, or CDs.

The above are only some specific embodiments and implementations of the present disclosure. It should be pointed out that for any person skilled in the art, on the premise of not deviating from the principle of the present disclosure, some improvements and embellishments may be made, and these improvements and embellishments should also be considered within the protection scope of the present disclosure.

What is claimed is:

1. A signal processing method, comprising:
    receiving dynamic control signaling from a network-side device in a preset period with a first duration unit, wherein the dynamic control signaling is configured to instruct a user equipment (UE) to determine an application delay, and the application delay is a delay for switching signal-receiving modes by the UE;
    determining the application delay on the basis of the dynamic control signaling; and
    executing a signal receiving operation by using a signal-receiving mode after switching in a second duration unit, wherein the second duration unit is determined according to the first duration unit and the application delay;
    wherein after receiving the dynamic control signaling from the network-side device in the preset period with the first duration unit, the method further comprises:
        switching from a source physical downlink control channel (PDCCH) search space (SS) group to a target PDCCH SS group by a trigger of at least one bit of the dynamic control signaling, wherein the source PDCCH SS group comprises: at least one source SS set, and the target PDCCH SS group comprises: at least one target SS set; or
        switching from a source parameter to a target parameter of a same PDCCH SS group by a trigger of at least one bit of the dynamic control signaling, wherein the source parameter comprises at least one of a source monitoring period, and a source monitoring position; and the target parameter comprises at least one of a target monitoring period, and a target monitoring position.

2. The method according to claim 1, wherein the signal-receiving modes comprises:
    a control channel receiving mode; or
    a signal measuring and receiving mode.

3. The method according to claim 1, wherein in response to the source PDCCH SS group being triggered to switch to the target PDCCH SS group, determining the application delay on the basis of the dynamic control signaling, comprises:
    determining a value of a minimum monitoring period in at least one source SS set as the application delay by a trigger of the dynamic control signaling; or,
    determining a value of a maximum monitoring period in at least one source SS set as the application delay by a trigger of the dynamic control signaling; or,
    determining a value of a minimum monitoring period in at least one target SS set as the application delay by a trigger of the dynamic control signaling; or,
    determining a value of a maximum monitoring period in at least one target SS set as the application delay by a trigger of the dynamic control signaling.

4. The method according to claim 1, wherein in response to the source PDCCH SS group being triggered to switch to the target PDCCH SS group and a source minimum offset value being triggered to switch to a target minimum offset value, determining the application delay on the basis of the dynamic control signaling, comprises:
    determining the application delay on the basis of the source minimum offset value by a trigger of the dynamic control signaling; or,
    determining the application delay on the basis of the target minimum offset value by a trigger of the dynamic control signaling.

5. The method according to claim 4, wherein:
    in response to switching across carriers or across bandwidth parts (BWP), a source minimum offset value or a target minimum offset value is configured on a scheduled carrier; or
    in response to switching across carriers or across BWP, a monitoring period of SS set is configured on a scheduling carrier; or
    in response to switching across carriers or across BWP, the application delay is switched from a scheduled carrier to a scheduling carrier; or
    in response to switching across carriers or across BWP, a first parameter, a second parameter, and a third parameter are configured as input parameters of a preset function to calculate the application delay; the first parameter is a minimum offset value of active BWP of a scheduled carrier, the second parameter is a subcarrier spacing (SCS) coefficient of active BWP of the scheduling carrier, the third parameter is a SCS coefficient of active BWP of the scheduled carrier; and the preset function is a round-up or round-down function.

6. The method according to claim 1, wherein determining the application delay on the basis of the dynamic control signaling comprises:

determining a preconfigured value, which is set by the network-side device for the UE, as the application delay, in response to a trigger of the dynamic control signaling.

7. The method according to claim 1, wherein time units of the first duration unit, the second duration unit and the application delay are slot.

8. The method according to claim 1, further comprising:
rolling back to the source PDCCH SS group, in response to not receiving a to-be-transmitted control signaling to the UE from the target PDCCH SS group before a timer preconfigured by the network-side device expires.

9. The method according to claim 8, wherein the timer starts, in response to a value of a bit in the dynamic control signaling corresponding to the timer changing.

10. The method according to claim 1, further comprising:
rolling back to a default PDCCH SS group preconfigured by the network-side device, in response to not receiving a to-be-transmitted control signaling to the UE from the target PDCCH SS group before a timer preconfigured by the network-side device expires.

11. The method according to claim 1, further comprising:
updating or resetting a timer, in response to receiving a to-be-transmitted control signaling to the UE from the target PDCCH SS group before a timer preconfigured by the network-side device expires.

12. An electronic device, comprising a processor and a non-transitory memory medium storing a computer program, the processor being configured for performing the computer program to execute a signal processing method, comprising:
receiving dynamic control signaling from a network-side device in a preset period with a first duration unit, wherein the dynamic control signaling is configured to instruct a UE to determine an application delay, and the application delay is a delay for switching signal-receiving modes by the UE;
determining the application delay on the basis of the dynamic control signaling; and
executing a signal receiving operation by using a signal receiving mode after switching in a second duration unit, wherein the second duration unit is determined according to the first duration unit and the application delay;
wherein after receiving the dynamic control signaling from the network-side device in the preset period with the first duration unit, the method further comprises:
switching from a source physical downlink control channel (PDCCH) search space (SS) group to a target PDCCH SS group by a trigger of at least one bit of the dynamic control signaling, wherein the source PDCCH SS group comprises: at least one source SS set, and the target PDCCH SS group comprises: at least one target SS set; or
switching from a source parameter to a target parameter of a same PDCCH SS group by a trigger of at least one bit of the dynamic control signaling, wherein the source parameter comprises at least one of a source monitoring period, and a source monitoring position; and the target parameter comprises at least one of a target monitoring period, and a target monitoring position.

13. An electronic device, comprising a processor and a non-transitory memory medium storing a computer program, the processor being configured for performing the computer program to execute a signal processing method, comprising:

configuring a dynamic control signaling, wherein the dynamic control signaling is configured to instruct a UE to determine an application delay, and the application delay is a delay for switching signal receiving modes by the UE; and
sending the dynamic control signaling to the UE, for rendering the UE to determine the application delay on the basis of the dynamic control signaling, and employ a signal receiving mode after being switched to execute a signal receiving operation;
wherein configuring the dynamic control signaling comprises:
configuring at least one bit in the dynamic control signaling, wherein the at least one bit is configured for triggering the UE to switch from a source PDCCH SS group to a target PDCCH SS group, the source PDCCH SS group comprises at least one source SS set, and the target PDCCH SS group comprises at least one target SS set; or,
configuring at least one bit in the dynamic control signaling, wherein the at least one bit is configured for triggering the UE to switch from a source parameter to a target parameter of a same PDCCH SS group, the source parameter comprises at least one of a source monitoring period, and a source monitoring position; and the target parameter comprises at least one of a target monitoring period, and a target monitoring position.

14. The electronic device according to claim 13, wherein the processor is configured for performing the computer program to execute a signal processing method, wherein in response to the source PDCCH SS group being triggered to switch to the target PDCCH SS group, configuring the dynamic control signaling comprises:
configuring a value of a minimum monitoring period in at least one source SS set as the application delay in the dynamic control signaling; or,
configuring a value of a maximum monitoring period in at least one source SS set as the application delay in the dynamic control signaling; or,
configuring a value of a minimum monitoring period in at least one target SS set as the application delay in the dynamic control signaling; or,
configuring a value of a maximum monitoring period in at least one target SS set as the application delay in the dynamic control signaling.

15. The electronic device according to claim 13, wherein the processor is configured for performing the computer program to execute a signal processing method, wherein in response to the source PDCCH SS group being triggered to switch to the target PDCCH SS group and a source minimum offset value being triggered to switch to a target minimum offset value, configuring the dynamic control signaling comprises:
configuring the source minimum offset value as the application delay in the dynamic control signaling; or,
configuring the target minimum offset value as the application delay in the dynamic control signaling.

16. The electronic device according to claim 13, wherein the processor is configured for performing the computer program to execute a signal processing method, wherein configuring the dynamic control signaling comprises:
configuring a preconfigured value as the application delay in the dynamic control signaling.

17. The electronic device according to claim 13, wherein the processor is configured for performing the computer program to execute a signal processing method, wherein the method further comprises:
  configuring a timer for the UE, for controlling the UE to roll back to the source PDCCH SS group in response to not receiving a to-be-transmitted control signaling from the target PDCCH SS group before the timer expires; or for triggering the UE to update or reset the timer in response to receiving the to-be-transmitted control signaling from the target PDCCH SS group before the timer expires.

18. The electronic device according to claim 13, wherein the processor is configured for performing the computer program to execute a signal processing method, wherein the method further comprises:
  configuring a timer and a default PDCCH SS group for the UE, for controlling the UE to roll back to the default PDCCH SS group in response to not receiving a to-be-transmitted control signaling from the target PDCCH SS group before the timer expires.

\* \* \* \* \*